(12) United States Patent
Messager et al.

(10) Patent No.: US 11,898,667 B2
(45) Date of Patent: Feb. 13, 2024

(54) LOCKING FITTING FOR A FLUID COUPLING

(71) Applicant: JPB Système, Montereau sur le Jard (FR)

(72) Inventors: Denis Messager, Melun (FR); Laure Le Bellu, Ivry sur Seine (FR)

(73) Assignee: JPB Système, Montereau sur le Jard (FR)

( * ) Notice: Subject to any disclaimer, the term of this patent is extended or adjusted under 35 U.S.C. 154(b) by 0 days.

(21) Appl. No.: 17/784,148

(22) PCT Filed: Jan. 29, 2020

(86) PCT No.: PCT/EP2020/052073
§ 371 (c)(1),
(2) Date: Jun. 10, 2022

(87) PCT Pub. No.: WO2021/121669
PCT Pub. Date: Jun. 24, 2021

(65) Prior Publication Data
US 2023/0025594 A1    Jan. 26, 2023

(30) Foreign Application Priority Data

Dec. 19, 2019 (EP) .................................... 19315165

(51) Int. Cl.
*F16L 15/08* (2006.01)
(52) U.S. Cl.
CPC ............ *F16L 15/08* (2013.01); *F16L 2201/20* (2013.01)
(58) Field of Classification Search
CPC ..... F16L 15/08; F16L 2201/20; F16B 39/282; F16B 39/284

(Continued)

(56) References Cited

U.S. PATENT DOCUMENTS 4,655,482 A * 4/1987 Myers .................. F16L 19/005
285/85
5,348,349 A * 9/1994 Sloane ................. F16L 19/005
285/86

(Continued)

FOREIGN PATENT DOCUMENTS

EP    0259582 A1    3/1988
EP    0427660 A2    5/1991

(Continued)

OTHER PUBLICATIONS

European Patent Office; Search Report in related International Patent Application No. PCT/EP2020/052073 dated Sep. 17, 2020; 3 pages.

*Primary Examiner* — David Bochna
(74) *Attorney, Agent, or Firm* — Dorton & Willis, LLP (57) ABSTRACT

A locking fitting assembly that can be removably installed in a tapped hole on a housing and resists unintended loosening of the fitting assembly. The fitting assembly maybe installed at a mounting location for receiving the fitting assembly, and includes abase with engagement structure configured to engage corresponding structure adjacent the mounting location to secure the base against rotation. The fitting assembly further includes a nipple fitting received on the base and having first and second oppositely disposed coupling features. The first coupling feature is configured to mate with a complementary coupling feature of the housing, such as the tapped hole, whereby the nipple fitting can be sealingly secured to the housing. Locking structure disposed between the base and the nipple fitting is configured to resist relative rotation between the base and the nipple fitting.

15 Claims, 5 Drawing Sheets

(58) Field of Classification Search
USPC .......................................................... 285/92
See application file for complete search history.

(56) References Cited

U.S. PATENT DOCUMENTS

| | | | | |
|---|---|---|---|---|
| 5,851,035 A | * | 12/1998 | Marc | F16L 19/005 |
| | | | | 285/86 |
| 5,882,044 A | * | 3/1999 | Sloane | F16L 19/005 |
| | | | | 285/321 |
| 6,692,036 B2 | * | 2/2004 | Kingsford | F16L 15/006 |
| | | | | 285/912 |
| 7,938,452 B2 | * | 5/2011 | Katsura | F16L 47/041 |
| | | | | 137/550 |
| 8,992,148 B2 | * | 3/2015 | Schafer | F16L 19/005 |
| | | | | 439/321 |
| 2011/0285127 A1 | | 11/2011 | Kacur et al. | |
| 2018/0356015 A1 | * | 12/2018 | Jahnke | F16L 15/08 |

FOREIGN PATENT DOCUMENTS

| | | |
|---|---|---|
| EP | 1178256 A2 | 2/2002 |
| WO | 2012 171241 A1 | 12/2012 |

\* cited by examiner

LOCKING FITTING FOR A FLUID COUPLING

CROSS-REFERENCE TO RELATED APPLICATIONS

This application is a national phase application under 35 U.S.C. § 371 of International Patent Application No. PCT/EP2020/052073, filed Jan. 29, 2020 (pending), which claims the benefit of priority to European Patent Application No. 19315165.1, filed Dec. 19, 2019 (expired), the disclosures of which are incorporated by reference herein in their entirety.

TECHNICAL FIELD

The present invention relates generally to fluid couplings and, more particularly, to a locking fitting for use in a fluid coupling.

BACKGROUND

Compression fittings are used in various fluid connections for joining conduits to one another or to an associated structure in a fluid tight manner. When such compression fittings are used in environments where the fitting components will be subjected to vibration, it is desirable to prevent inadvertent loosening of the fitting components. In some applications, a double-threaded pipe fitting having a flared or tapered end may be installed in a tapped hole provided in a manifold housing or other structure. One end of the fitting may include a conical or semi-spherical taper for sealingly engaging a corresponding flared connection of an adjoining conduit. Conventional methods of preventing unwanted loosening of such fittings include the use of lock wires to secure the installed fitting to adjacent structure. The use of such lock wires is time consuming and labor intensive, particularly in applications where several such fittings much be installed and secured. A need therefore exists for improved fittings that resist inadvertent loosening and which overcome these and other drawbacks of conventional fittings.

SUMMARY

The present invention provides a locking fitting assembly that can be removably installed in a tapped hole on a housing and which resists unintended loosening of the fitting assembly in service, such as may be due to vibration. While the invention will be described in connection with certain embodiments, it will be understood that the invention is not limited to these embodiments. On the contrary, the invention includes all alternatives, modifications, and equivalents as may be included within the spirit and scope of the invention.

According to one aspect, the fitting assembly can be installed at a mounting location for receiving the nipple fitting assembly, and includes a base with engagement structure configured to engage corresponding structure adjacent the mounting location to secure the base against rotation. The fitting assembly further includes a nipple fitting received on the base and having first and second oppositely disposed coupling features. The first coupling feature is configured to mate with a complementary coupling feature of the housing, such as the tapped hole, whereby the nipple fitting can be sealingly secured to the housing. Locking structure disposed between the base and the nipple fitting is configured to resist relative rotation between the base and the nipple fitting.

In one embodiment, the locking structure includes first locking structure associated with the base and second locking structure associated with the nipple fitting. The first and second locking structure cooperate to resist the relative rotation between the base and the nipple fitting. The first and second locking structure may be integral with the base and nipple fitting, respectively, or may be separate components that are operatively coupled with the base and nipple fitting. The first or second locking structure may further include resilient members that are deformed during the relative rotation between the nipple fitting and the base. The resilient members can be arranged and configured in various manners to facilitate tuning a threshold torque that must be exceeded before the nipple fitting can be rotated relative to the housing.

The above and other objects and advantages of the invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1A:
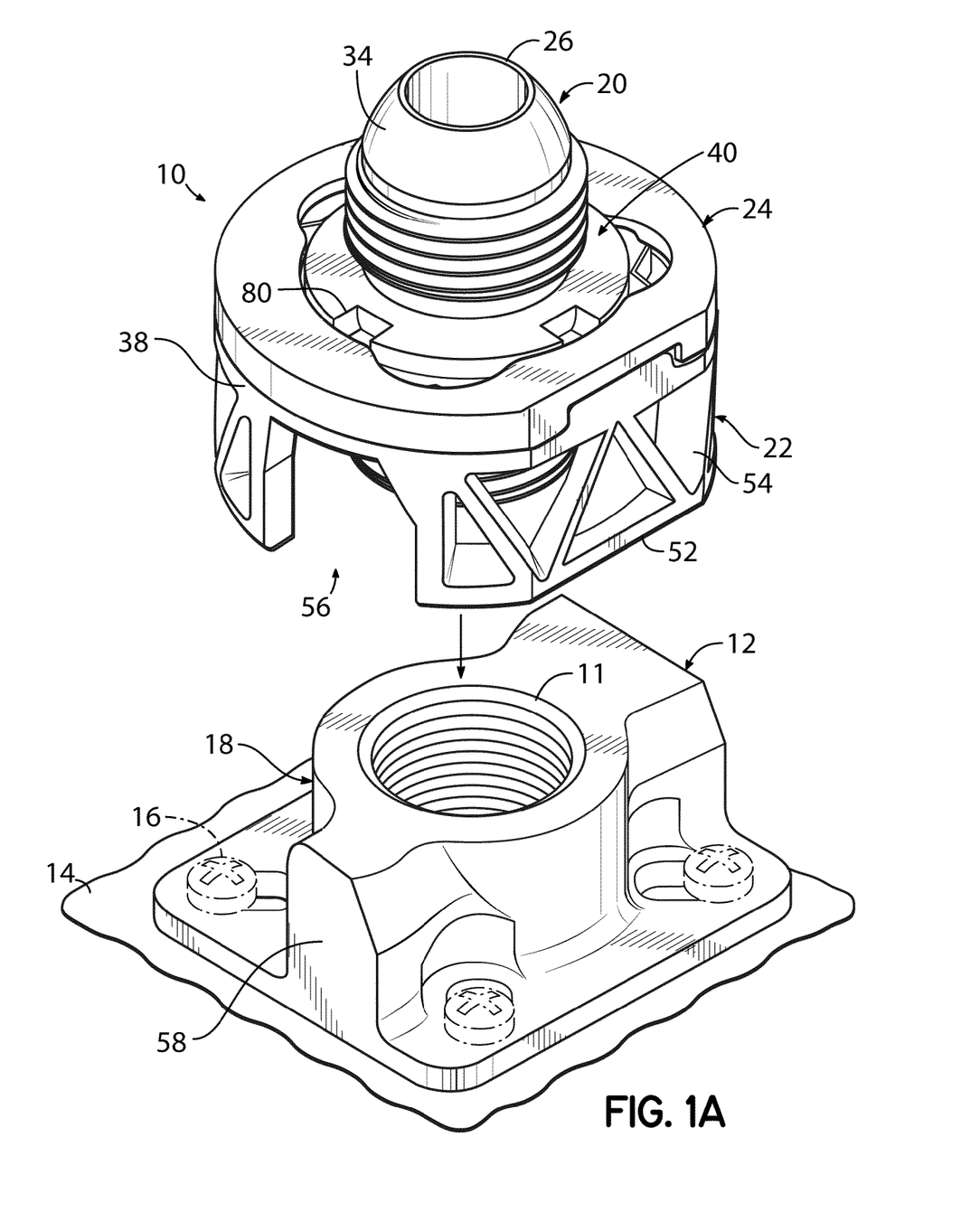
FIG. 1A is a perspective view of an exemplary fitting assembly in accordance with the principles of the present disclosure adjacent a mounting location of a housing.
Figure 1B:
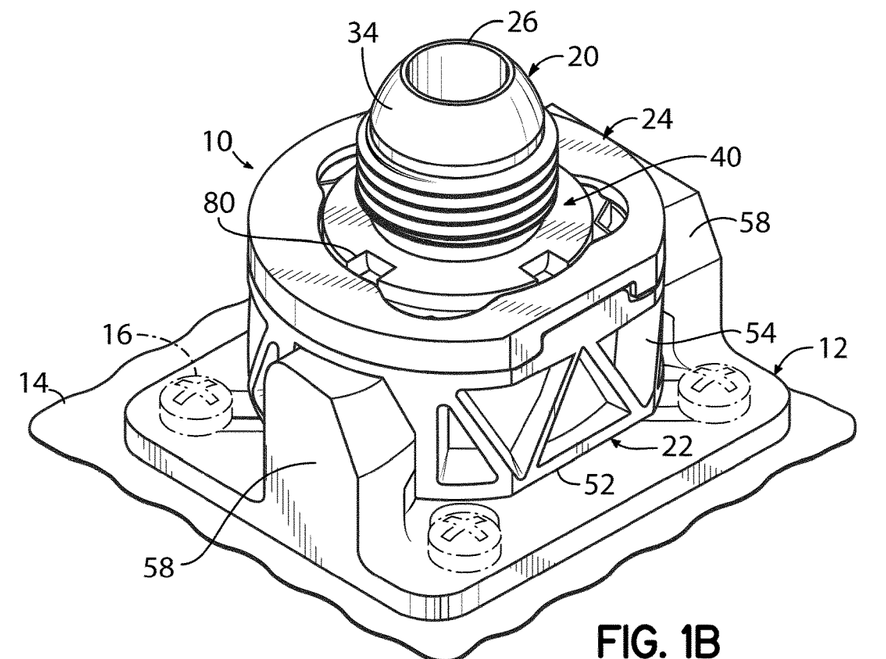
FIG. 1B is a perspective view of fitting assembly of FIG. 1A installed at the mounting location.

FIGS. 1A and 1B depict an exemplary locking fitting assembly 10 in accordance with the principles of the present disclosure. The fitting assembly 10 can be installed into a tapped hole 11 at a mounting location 12 of a manifold housing 14 or other structure to facilitate coupling conduits to the housing 14 in a fluid tight manner. In the embodiment shown, a mounting location 12 for the tapped hole 11 is depicted as being attached to the housing 14 by fasteners 16, however, it will be appreciated that a mounting location 12 may alternatively be integrally formed with the housing 14. The mounting location 12 includes a mounting boss 18 projecting outwardly from the housing 14 and defining the tapped hole 11. The mounting location 12 further includes structural features proximate the tapped hole that facilitate engagement with the fitting assembly 10, as described more fully below.

Figure 2:
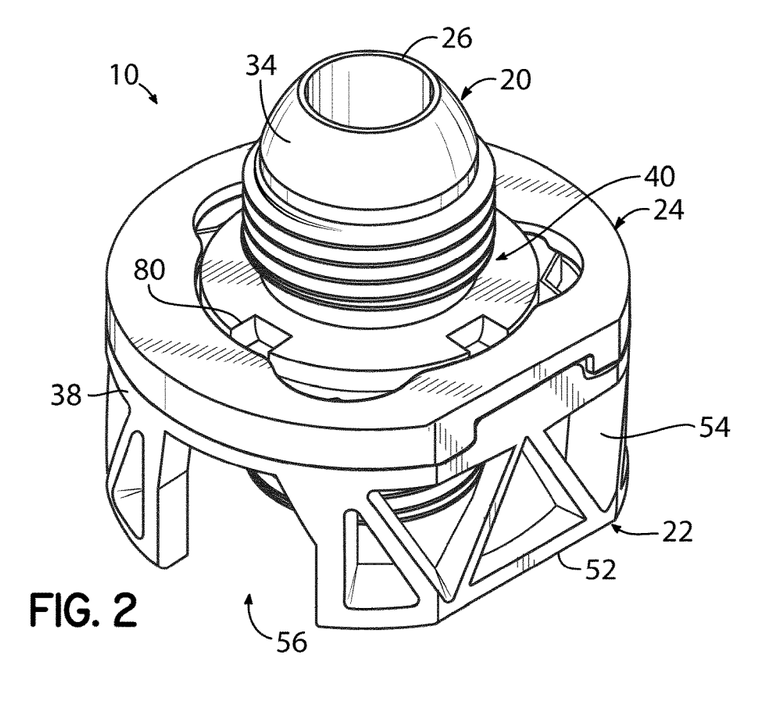
FIG. 2 is another perspective view of the fitting assembly of FIG. 1A.
Figure 3:
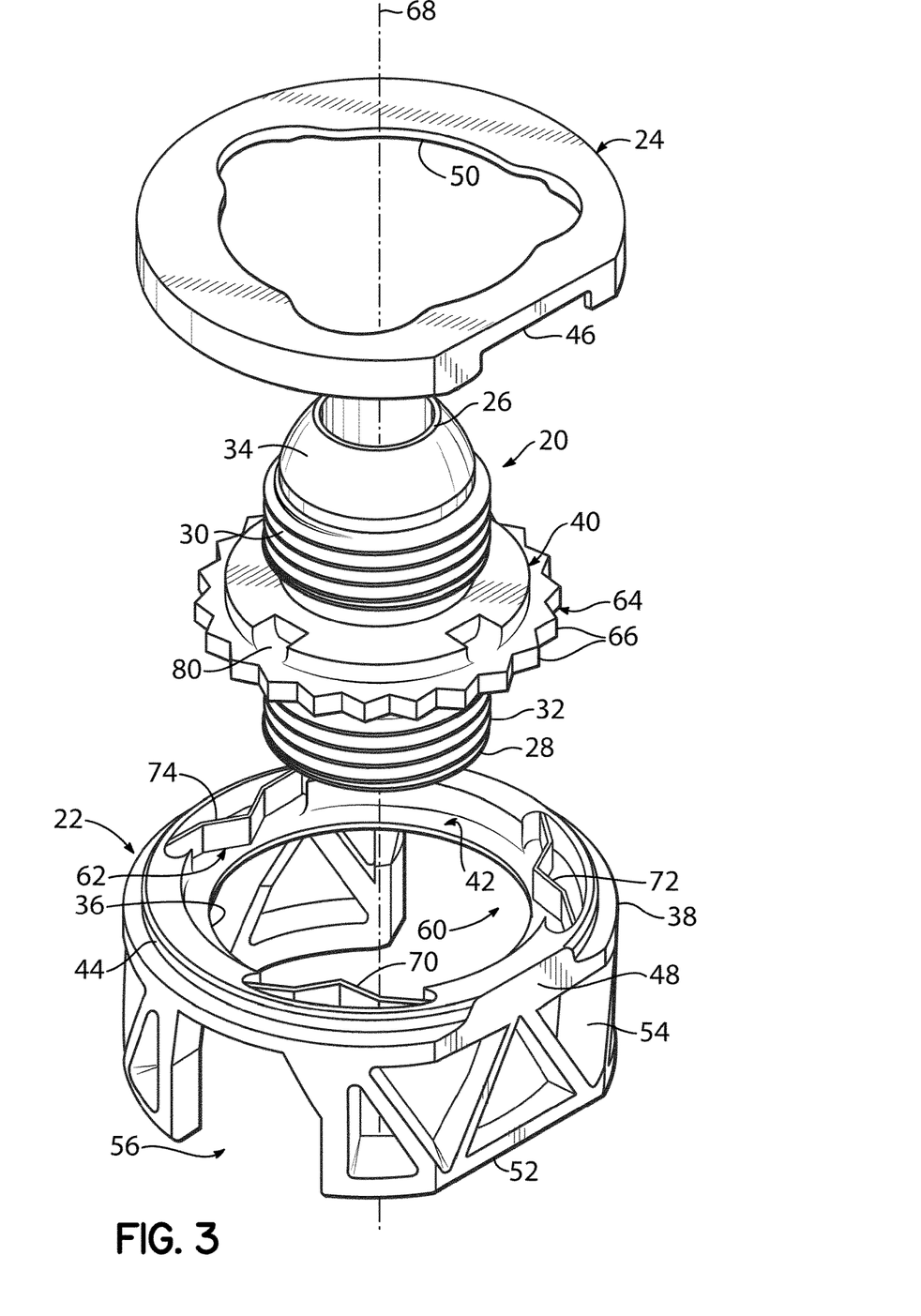
FIG. 3 is an exploded perspective view of the fitting assembly of FIG. 2.

With continued reference to FIGS. 1A and 1B, and referring further to FIGS. 2 and 3, the fitting assembly 10 comprises a double-threaded nipple fitting 20 that is rotatably captured to a base 22 by a cover 24. The nipple fitting 20 includes first and second terminal ends 26, 28 with corresponding first and second external threads 30, 32 formed proximate the respective terminal ends 26, 28. The second external thread 32 is configured to threadably engage a complementary thread of the tapped hole 11 during installation of the fitting assembly 10 at the mounting location 12. The first end 26 of the nipple fitting 20 may include a conical or semi-spherical tip 34 for sealingly engaging a corresponding flared end of a conduit (not shown) when the conduit is joined with the first end 26 of the nipple fitting 20 and a tightening nut (not shown) is engaged with the first thread 30.

The second end 28 of the nipple fitting 20 is received through a central aperture 36 in a first end 38 of the base 22, and the nipple fitting 20 is supported on the base 22 by an annular collar 40 disposed between the first and second ends 26, 28 of the nipple fitting 20. The annular collar 40 engages a corresponding annular bearing surface 42 at the first end 38 of the base 22, whereby the nipple fitting 20 may be rotated within the central aperture 36 relative to the base 22.

The nipple fitting 20 is captively retained on the base 22 by a cover 24 that is received on the first end 38 of the base 22 and engaged with a raised rim 44 on the first end 38 of the base 22. The cover 24 may include a locating feature 46, such as a cutout or opening, configured to engage a complementarily shaped locating feature 48 on the base 22, whereby an orientation of the cover 24 relative to the base 22 may be ensured if needed. The cover 24 further includes an aperture 50 through which the first end 26 of the nipple fitting 20 protrudes. The cover aperture 50 has an effective diameter that is smaller than the outer diameter of the collar 40, whereby the collar 40 is retained between the cover 24 and the bearing surface 42 at the first end 38 of the base 22 to thereby rotatably capture the nipple fitting 20 on the base 22.

The second end 52 of the base 22 comprises a circumferential sidewall 54 defining at least first engagement structure 56 for engaging the complementarily shaped structure 58 adjacent the boss 18 of the mounting location 12, such that the base 22 is secured against rotation relative to the housing 14 when installed on the mounting location 12. In the embodiment shown, the base 22 includes first and second engagement structure 56, 60 in the form of openings in the circumferential sidewall 54. While the embodiment shown and described herein includes first and second engagement structure 56, 60 in the form of openings in the sidewall 54, it will be appreciated that the engagement structure 56, 60 may have various other configurations suitable for engaging corresponding structure 58 on the mounting location 12 to prevent relative rotation between the base 22 and the housing 14. Likewise, it will be appreciated that only a single engagement structure, or more than two engagement structures may be provided for engaging complementarily shaped features adjacent the tapped hole 11 to prevent relative rotation between the base 22 and the housing 14. The circumferential sidewall 54 of the base 22 is depicted as comprising a truss-like or cage-like structure, however, it will be appreciated that the circumferential sidewall 54 may alternatively have various other configurations suitable for defining the engagement structure 56, 60 of the base 22.

The exemplary fitting assembly 10 further includes locking structure between the base 22 and the nipple fitting 20 that is configured to resist relative rotation between the nipple fitting 20 and the base 22 until a torque applied to rotate the nipple fitting 20 exceeds a predefined threshold value. The threshold value may be selected such that the locking structure resists relative rotation between the nipple fitting 20 and the base 22 due to vibration. In the embodiment shown, the fitting assembly 10 includes first locking structure 62 on the base 22 and second locking 64 structure on the nipple fitting 20, wherein the first and second locking structure 62, 64 cooperate to resist the relative rotation between the base 22 and the nipple fitting 20.

With continued reference to FIG. 3, the second locking structure 64 of the illustrated embodiment is integral with the nipple fitting 20 and comprises at least one radially outwardly extending projection 66 on the collar 40 relative to an axis that is parallel to the rotational (screwing) axis 68 of the nipple fitting 20. More particularly, the second locking structure 64 comprises a plurality of radially outwardly extending projections 66 in the form of teeth disposed around the circumference of the collar 40. The first locking structure 62 in this embodiment includes at least one radially extending projection 70 provided at the first end 38 of the base 22 and arranged to engage the radially outwardly extending projections 66, or teeth, of the second locking structure 34 when the nipple fitting 20 is captured on the base 22 in the assembled condition.

In the embodiment shown, the first locking structure 62 comprises three resilient members 72 disposed on the first end 38 of the base 22 and spaced around the circumferential sidewall 54. The resilient members 72 define the radially inwardly extending projections 70 that engage the radially outwardly extending projections 66 of the second locking structure 64 on the nipple fitting 20. Each of the resilient members 72 is received in a recess, or pocket 74, formed in the first end 38 of the base 22 and is captured therein when the cover 24 is secured to the first end 38 of the base 22. While the exemplary fitting assembly 10 shown and described herein includes three resilient members 72 defining the first locking structure 62, it will be appreciated that various other numbers and arrangements of resilient members 72 may alternatively be used to engage the second locking structure 64. Advantageously, the number and configuration of the resilient members 72 may be selected to facilitate tuning the amount of torque required to rotate the nipple fitting 20 relative to the base 22 when the first and second locking structure 62, 64 are engaged. In this way, the threshold torque required to rotate the nipple fitting 20 in the base 22 may be selectively adjusted. As the nipple fitting 20 is rotated relative to the base 22, the resilient members 72 are deformed as the radially outwardly extending projections/teeth 66 of the second locking structure 64 are caused to move relative to the radially inwardly extending projections 70 of the resilient members 72.

In use, the exemplary locking fitting assembly 10 is coupled with a housing 14 at the mounting location 12 such that the engagement structure 56, 60 is received over and engages the complementary structure 58 of the mounting location 12 proximate the tapped hole 11, whereby relative rotation between the base 22 and housing 14 is prevented. The nipple fitting 20 is then rotated using an appropriate tool to threadably engage the second thread 32 of the fitting assembly 10 with the tapped hole 11, and the nipple fitting 20 is screwed into the tapped hole 11 until fully seated. Tool engaging structure 80 may be provided on the fitting assembly 10 to facilitate engagement of the nipple fitting 20 with a tool for installing and removing the fitting assembly 10 from the mounting location 12 by rotating the nipple fitting 20. In the embodiment shown, the fitting assembly 10 includes tool engaging structure 80 in the form of recesses formed into the annular collar 40 of the nipple fitting 20. The recesses are arranged circumferentially around the collar 40 and are accessible through the cover aperture 50 when the fitting assembly 10 is in the assembled condition. During rotation of the nipple fitting 20 relative to the base 22, the second locking structure 64 associated with the nipple fitting 20 moves relative to the first locking structure 62 associated with the base 22 and deforms the resilient members 72. The first and second locking structure 62, 64 thereafter cooperate to resist loosening of the nipple fitting 20 in the tapped hole 11 until a threshold torque is applied sufficient to move the second locking structure 64 relative to the first locking structure 62.

Figure 4:
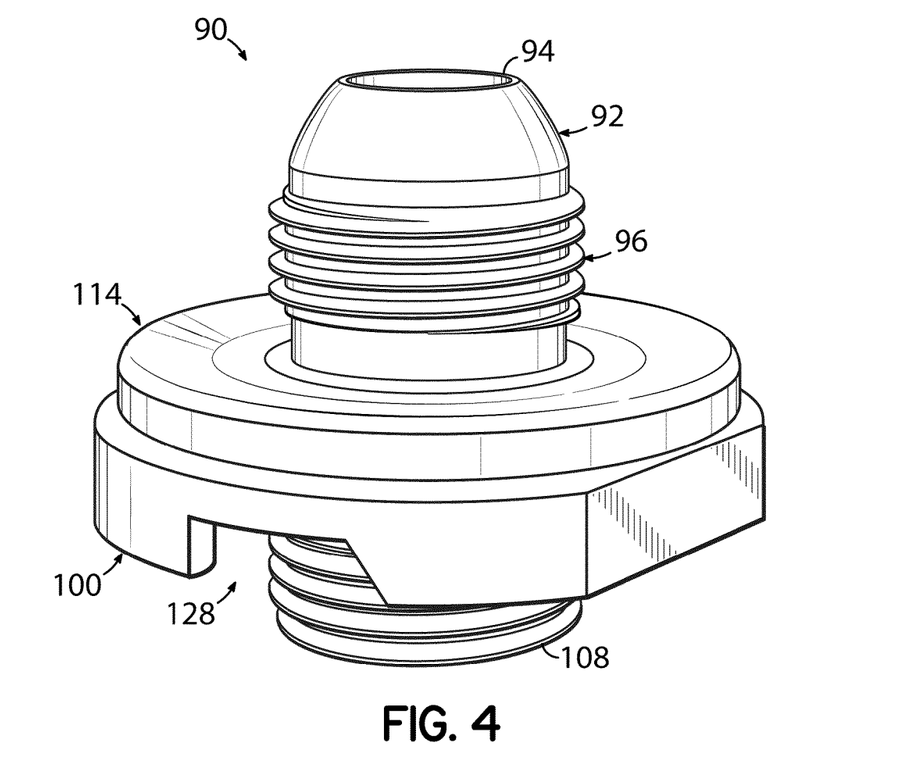
FIG. 4 is a perspective view of another embodiment of an exemplary fitting assembly in accordance with the principles of the present disclosure.
Figure 5:
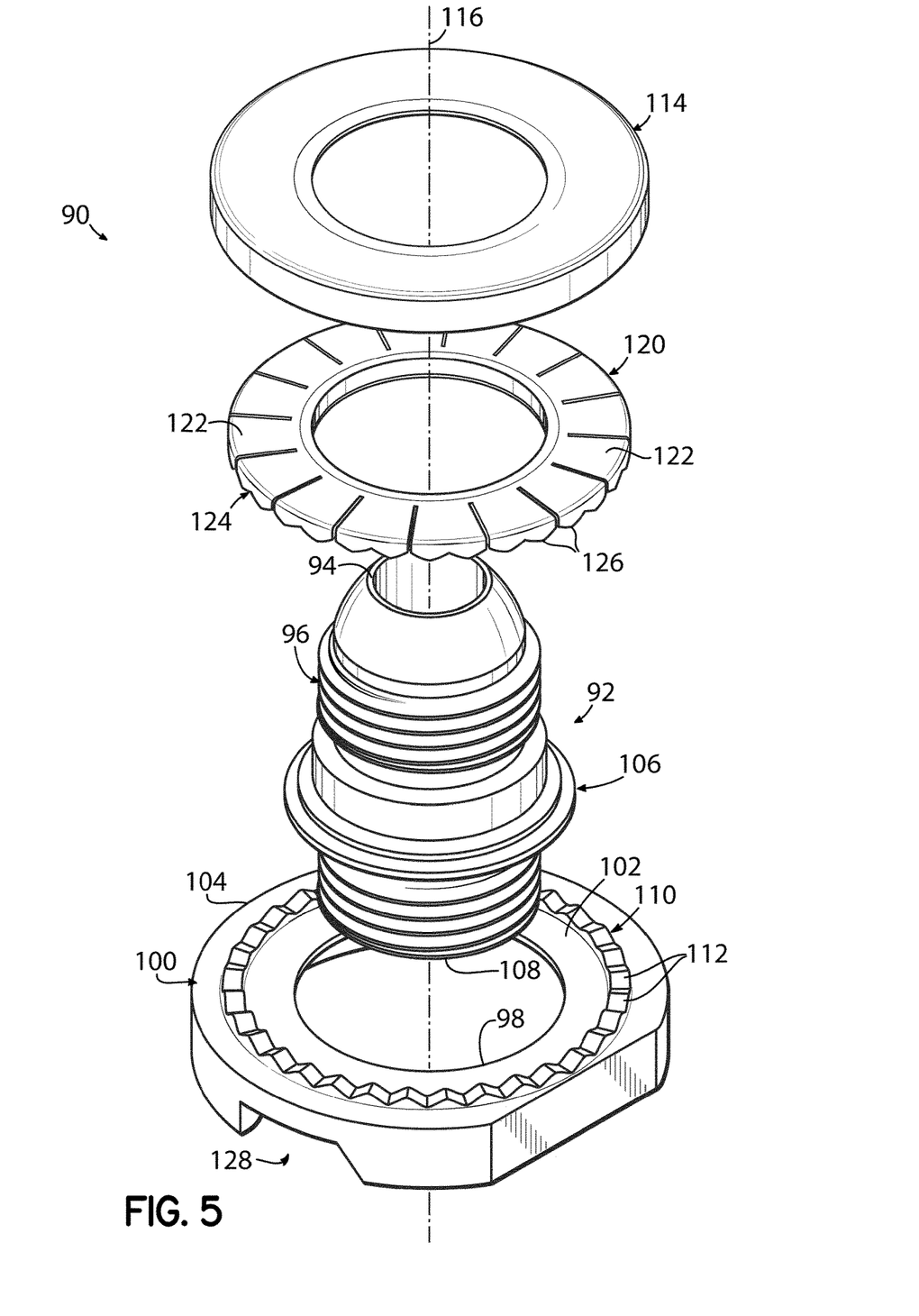
FIG. 5 is an exploded perspective view of the embodiment of FIG. 4.

FIGS. 4 and 5 depict another exemplary embodiment of a locking fitting assembly 90 in accordance with the principles of the present disclosure and which can be installed into a tapped hole 11 at a mounting location 12 of a manifold housing 14 or other structure to facilitate coupling conduits to the housing 14 in a fluid tight manner. Various features of the fitting assembly 90 of this embodiment are similar to the locking fitting assembly 10 discussed above with respect to FIGS. 1-3, and only certain differences will be described in detail. The fitting assembly 90 comprises a double-threaded nipple fitting 92 having a first end 94 with a first external thread 96 received through a central aperture 98 of the base 100 and is supported on a bearing surface 102 at the first end 104 of the base 100 by an annular collar 106 between the first and second ends 94, 108 of the nipple fitting 92. Locking structure is provided between the base 100 and the nipple fitting 92 to resist relative rotation therebetween and, in this embodiment, first locking structure 110 is formed integrally with the base 100 and comprises a plurality of projections 112 (in the form of teeth) extending toward the cover 114 along a direction parallel to the rotational (screwing) axis 116 of the nipple fitting 92. The projections 112 of the first locking structure 110 are in the form of teeth and are disposed in an annular arrangement at the first end 104 of the base 100.

The second locking structure 120 is associated with the nipple fitting 92 and comprises a plurality of resilient members 122 in the form of radially outwardly extending fingers of an annular member 124 that is received over the first end 94 of the nipple fitting 92. The annular member 124 is supported on the collar 106 and is captured between the collar 106 and the cover 114 in the assembled condition of the fitting assembly 90. The second locking structure 120 further includes a plurality of axially extending projections 126 in the form of teeth configured to engage the projections/teeth 112 of the first locking structure 110 so as to resist relative rotation between the base 100 and the nipple fitting 92.

The locking fitting assembly 90 depicted in FIGS. 4-5 may be received onto a mounting location 12 of a housing 14 such that engagement structure 128 of the base 100 engages complementary structure of the mounting location 12 and the nipple fitting 92 may be threadably coupled with a tapped hole 11 in the same manner described above with respect to locking fitting assembly 10. As the nipple fitting 92 is rotated relative to the base 100, the second locking structure 120 associated with the nipple fitting 92 moves relative to the first locking structure 110 and the resilient members 122 of the second locking structure 120 are deformed as the projections/teeth 126 of the second locking structure 120 move over the projections/teeth 112 of the first locking structure 110. Cooperation of the first and second locking structure 110, 120 resists loosening of the nipple fitting 92 in the tapped hole 11 until a torque applied to the nipple fitting 92 exceeds a threshold torque of the fitting assembly 90. Advantageously, the resilient members 122 of the second locking structure 120 may be configured and arranged for cooperation with the first locking structure 110 to facilitate tuning the amount of torque required to rotate the nipple fitting 92 relative to the base 100 when the first and second locking structure 110, 120 are engaged.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

The invention claimed is:

1. A locking nipple fitting assembly for selective removable coupling with a housing having a mounting location for receiving the nipple fitting assembly, the assembly comprising:
a base having first engagement structure configured to engage structure adjacent the mounting location such that the base is secured against rotation relative to the housing;
a nipple fitting received on the base and having first and second oppositely disposed coupling features, the first coupling feature configured to mate with a complementary coupling feature of the housing at the mounting location whereby the nipple fitting may be secured to the housing; and
locking structure between the base and the nipple fitting, the locking structure configured to resist relative rotation between the base and the nipple fitting until a torque applied to rotate the nipple fitting in a loosening direction exceeds a predefined threshold.

2. The assembly of claim 1, wherein the locking structure comprises first locking structure associated with the base and second locking structure associated with the nipple fitting, the first and second locking structure cooperating to resist the relative rotation between the base and the nipple fitting.

3. The assembly of claim 2, wherein the second locking structure is integrally formed with the nipple fitting.

4. The assembly of claim 2, wherein at least one of the first locking structure or the second locking structure is configured as a resilient element that deforms upon relative rotation between the base and the nipple fitting.

5. The assembly of claim 2, wherein:
the first locking structure comprises at least one radially inwardly extending projection with respect to an axial direction of the nipple fitting;
the second locking structure comprises at least one radially outwardly extending projection with respect to an axial direction of the nipple fitting; and
the at least one radially outwardly extending projection is configured to engage the at least one radially outwardly inwardly extending projection of the first locking structure to thereby resist relative rotation between the base and the nipple fitting.

6. The assembly of claim 5, wherein the second locking structure comprises a plurality of radially outwardly extending teeth disposed around a circumference of the nipple fitting.

7. The assembly of claim 6, wherein the first locking structure comprises at least one resilient member defining the at least one radially inwardly extending projection.

8. The assembly of claim 7, wherein the at least one resilient member is configured to deform when a torque applied to impart relative rotation between the base and the nipple fitting exceeds the predetermined threshold.

9. The assembly of claim 7, further comprising:
at least one recess formed in the base;
the at least one resilient member received in the recess.

10. The assembly of claim 2, wherein:
the first locking structure comprises at least one first projection extending in first axial direction with respect to the nipple fitting;
the second locking structure comprises at least one second projection extending in second axial direction opposite the first axial direction; and
the at least one first projection is configured to engage the at least one second projection to thereby resist relative rotation between the base and the nipple fitting.

11. The assembly of claim 1, further comprising tool engaging structure on the nipple fitting and adapted to engage a tool for installing the locking nipple fitting assembly on the housing by rotation of the nipple fitting.

12. A locking nipple fitting assembly for selective removable coupling with a housing having a mounting location for receiving the nipple fitting assembly, the assembly comprising:
a base having first engagement structure configured to engage structure adjacent the mounting location such that the base is secured against rotation relative to the housing;
a nipple fitting received on the base and having first and second oppositely disposed coupling features, the first coupling feature configured to mate with a complementary coupling feature of the housing at the mounting location whereby the nipple fitting may be secured to the housing;
locking structure between the base and the nipple fitting, the locking structure configured to resist relative rotation between the base and the nipple fitting until a torque applied to rotate the nipple fitting exceeds a predefined threshold; and
a cover received on the base and capturing the nipple fitting to the base for relative rotation with respect thereto.

13. A method of securing a removable nipple fitting assembly to a housing having a mounting location for receiving the nipple fitting assembly, the method comprising:
mounting the nipple fitting assembly onto the housing such that a base of the nipple fitting assembly engages complementary structure proximate the mounting location and prevents relative rotation between the base and the housing;
rotating a nipple fitting of the assembly relative to the base such that the nipple fitting is operatively coupled with the housing in a fluid-tight manner;
resisting rotation of the nipple fitting relative to the base with a locking structure between the base and the nipple fitting when a torque applied to rotate the nipple fitting is below a threshold torque; and
enabling relative rotation between the nipple fitting and the base when a torque applied to rotate the nipple fitting in a loosening direction exceeds the threshold torque.

14. The method of claim 13, wherein resisting rotation of the nipple fitting comprises engaging first locking structure on the base with second locking structure on the nipple fitting.

15. The method of claim 13, wherein:
the nipple fitting assembly comprises first locking structure on the base and second locking structure on the nipple fitting, the first and second locking structure cooperating to resist relative rotation between the base and the nipple fitting; and
enabling relative rotation comprises deforming at least one of the first locking structure or the second locking structure.

* * * * *